United States Patent [19]
Tsutsumishita et al.

[11] 3,903,250
[45] Sept. 2, 1975

[54] PROCESS FOR TREATING WASTE WATER EFFLUENT HAVING ODOURS

[75] Inventors: Koichi Tsutsumishita; Yo Yokoyama; Tetsuo Egawa, all of Yokkaichi, Japan

[73] Assignee: Daikyo Oil Company Ltd., Tokyo, Japan

[22] Filed: Mar. 28, 1972

[21] Appl. No.: 238,903

[52] U.S. Cl. .................................. 423/563; 210/21
[51] Int. Cl. ............................................. C01b 17/16
[58] Field of Search ........... 423/563, 580; 23/312 S, 23/312 A, 312 W; 55/36; 210/511, 21; 260/705, 708

[56] References Cited
UNITED STATES PATENTS

| | | | |
|---|---|---|---|
| 1,018,374 | 2/1912 | Robinson | 423/563 |
| 2,761,563 | 9/1956 | Waterman et al. | 23/312 W |
| 3,063,817 | 11/1962 | Simpson | 23/312 S |

Primary Examiner—G. O. Peters
Attorney, Agent, or Firm—Fred Philpitt

[57] ABSTRACT

A waste water effluent having odours from a chemical apparatus, which contains hydrogen sulfide, mercaptanes and other sulfur compounds, is allowed to come in contact with a hydrocarbon oil having a molecular weight preferably of 100 – 300 such as kerosene in a preferable mixing ratio of the hydrocarbon oil to the waste water effluent of 10 – 1:1 by volume thereby to extract and transfer the sulfur compounds into the hydrocarbon oil, separating the mixture into the oil and the water by settlement, and using the separated water in a second contact with another hydrocarbon oil or with crude oil or the like in a desalting means or in a gas scrubbing means, while feeding the separated oil in a hydrogenation-desulfurizing means to recover the absorbed sulfur compounds as hydrogen sulfide.

6 Claims, 1 Drawing Figure

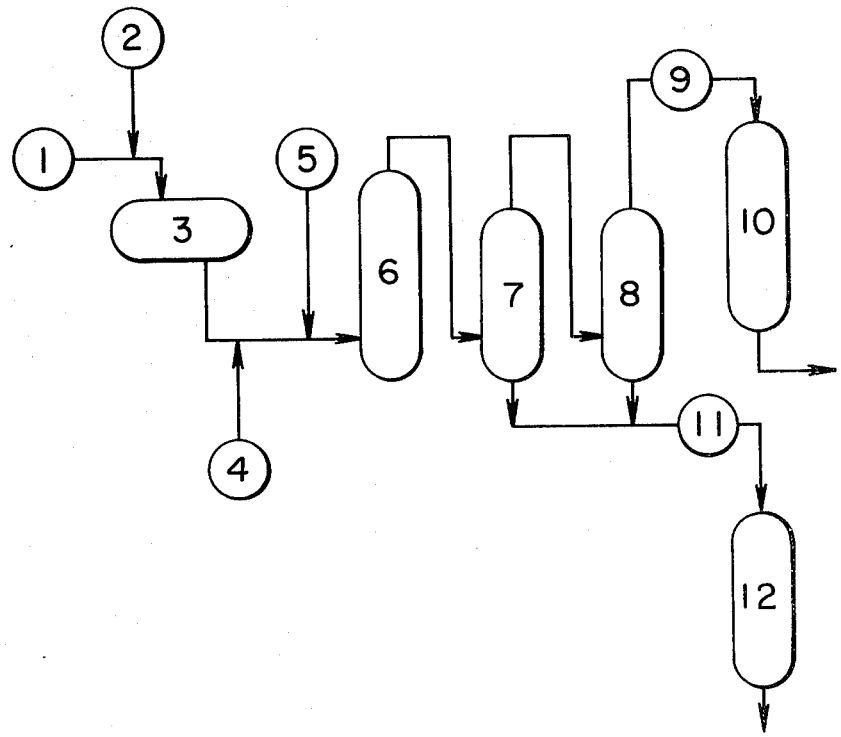

PROCESS FOR TREATING WASTE WATER EFFLUENT HAVING ODOURS

This invention relates to a process for making odourless a water effluent containing sulfur compounds from a chemical apparatus through a treatment and using the treated water as feed water to other apparatus or discharging it to river, sea, etc.

Increase in demand for petroleum fuel oil due to recent rapid increase in demand for energy as well as increase in demand for petrochemical products due to rapid progress of petrochemical industries have been remarkable.

Accordingly, in view of a prevention of air pollution due to larger production scales of petroleum refineries and petrochemical industries, hydrogenation-desulfurizing apparatuses and gas scrubbing apparatuses have been operated in larger scale for naphtha, kerosene, gas oil or further heavy oil, etc., to decrease sulfur contents of petroleum fuel oils and decrease sulfur contents of a feedstock for petrochemical processes as well as those of the resulting products.

On the other hand, from the standpoint of prevention of public nuisance, there have occurred problems as to how cheap a large amount of waste water effluent containing sulfur compounds and having odours can be treated and deodorized so that the resulting water may be effectively utilized or discharged to river, sea, etc. without any pollution.

Therefore, various studies have been heretofore made on a process for efficiently deodorizing these waste water effluent having odours. The stripping process is an only process which is now used in an industrial scale, where the waste water effluent having odours is stripped with steam, and the substances having odours are recovered or burnt. But, the stripping process has such a disadvantage that the operating cost is very high.

The present invention mainly comprises allowing a waste water effluent having odours to come in contact with a hydrocarbon oil thereby to absorb the substances having odours into the hydrocarbon oil, and then separating the oil and the water. The separated water can be used as feed water to other apparatus or discharged to river, sea or the like. The oil which has absorbed the substances having odours, can be made free from the substances having odours, for example, by passing the oil through a hydrogenation-desulfurizing apparatus. Thus, in the present invention, deodorization of waste water effluent having odours can be carried out far more readily at a lower cost than in the conventional steam stripping process.

The principle of the present invention is based on such a fact that a partition coefficient of sulfur compounds, which are main substances having disagreeable odours contained in the waste water effluent having odours, towards the hydrocarbon oil, is larger than that towards water. For example, results as shown in Table 1 were obtained in experiments carried out by the present inventors. That is, the experiments were carried out by adjusting pH of a waste water effluent having odours and containing sulfur compounds such as hydrogen sulfide, etc. with a mineral acid or alkali, mixing it with a hydrocarbon oil having an average molecular weight of about 150 with stirring, then settling the mixture thereby to separate the hydrocarbon oil and water, and measuring the contents of hydrogen sulfide and mercaptanes in each of the hydrocarbon oil and the waste water.

Table 1

| pH | Hydrocarbon oil Hydrogen sulfide ppm | Mercaptanes ppm | Waste water Hydrogen sulfide ppm | Mercaptanes ppm |
| --- | --- | --- | --- | --- |
| 9.1 | 24 | 203 | 1,260 | 0 |
| 7.0 | 326 | 224 | 934 | 0 |
| 6.5 | 510 | 223 | 720 | 0 |
| 6.0 | 728 | 203 | 472 | 0 |
| 5.2 | 1,292 | 211 | 189 | 0 |
| 4.0 | 1,438 | 218 | 54 | 0 |

(The hydrocarbon oil and the waste water effluent having odours were mixed in equal amounts.)

As is seen from Table 1, the partition coefficient of hydrogen sulfide towards the hydrocarbon oil is about twice the partition coefficient towards water at pH 6.0. Thus, if a mixing ratio of the hydrocarbon oil to the waste water effluent having odours is increased to 3 − 5, the contents of hydrogen sulfide and mercaptanes in the waste water can be greatly reduced. Relations among the mixing ratio, pH and the contents of sulfur compounds are shown in Table 2. In the experiment, a distillate kerosene having an average molecular weight of about 150, which was obtained by an atmospheric pressure distillation apparatus, was mixed with a pH-adjusted waste water effluent having odours in a definite ratio and stirred for about 15 minutes, and then the resulting mixture was settled for about 30 minutes to separate the kerosene and the water. The contents of hydrogen sulfide and mercaptanes in each of the separated kerosene and waste water were analyzed.

Table 2

(1) Mixing ratio of kerosene to waste water effluent having odours: 3 : 1

| pH | Kerosene Hydrogen sulfide ppm | Mercaptanes ppm | Waste water effluent Hydrogen sulfide ppm | Mercaptanes ppm |
| --- | --- | --- | --- | --- |
| 9.1 | 17 | 171 | 1,254 | 0 |
| 7.0 | 241 | 203 | 698 | 0 |
| 6.5 | 330 | 195 | 470 | 0 |
| 6.0 | 402 | 215 | 279 | 0 |
| 5.2 | 467 | 208 | 119 | 0 |
| 4.0 | 488 | 197 | 48 | 0 |

(2) Mixing ratio of kerosene to waste water effluent having odours: 5 : 1

| pH | Kerosene Hydrogen sulfide ppm | Mercaptanes ppm | Waste water effluent Hydrogen sulfide ppm | Mercaptanes ppm |
| --- | --- | --- | --- | --- |
| 9.1 | 12 | 203 | 1,262 | 0 |
| 7.0 | 188 | 162 | 545 | 0 |
| 6.5 | 230 | 183 | 350 | 0 |
| 6.0 | 263 | 201 | 190 | 0 |
| 5.2 | 290 | 196 | 65 | 0 |
| 4.0 | 295 | 189 | 40 | 0 |

As compared with said Table 1, the transfer of hydrogen sulfide into the distillate kerosene in the case of Table 2 was effected unexpectedly less, because of the stirring and settlement each effected for a limited time. In other wards, it is seen that a better result can be obtained, if the mixing is carried out sufficiently. The original waste water effluent having odours contained 12 ppm of mercaptanes, but in any of these cases, the mercaptanes were completely transferred to the hydrocarbon oil phase.

It is seen from Table 2 that a better result can be obtained when the treatment is carried out at a lower pH, but generally the waste water effluent contains ammonium ions, and ammonium sulfate is sometimes deposited if the pH is less than 6. Therefore, it was confirmed by the experiments that the optimum pH was about 6.2 to 6.3. However, in the present invention, a pH within the range of 7 – 4, preferably 7 – 6, can be employed depending on other conditions.

As explained above, a hydrocarbon oil having an average molecular weight of 100 – 300 (a distillate kerosene obtained by the atmospheric pressure distillation apparatus is most desirable, but a distillate gas oil or other hydrocarbon oils having a molecular weight in said range can be also used) is mixed with a waste water effluent having odours in a definite mixing ratio, with stirring, according to the contents of sulfur compounds as substances having odours, for example, hydrogen sulfide, mercaptanes, etc. in the waste water effluent having odours, thereby to extract and transfer the substances having odours contained in the waste water effluent having odours to the hydrocarbon oil side in the present invention.

Then, the resulting oil-water mixture was separated into the hydrocarbon oil containing the substances having odours and the water. The water containing a trace of the residual sulfur compounds, for example, 100 – 200 ppm thereof, can be used as feed water to a desalting apparatus in the petroleum refinery industry, or as feed water to other apparatuses, for example, hydrogenation-desulfurizing apparatus, gas scrubbing apparatus, etc. in the petroleum refinery industry having no desalting apparatus or petrochemical industries.

When the water is used as feed water to the desalting apparatus, it is allowed to come in contact with a large amount of crude oil, raw oil or other hydrocarbon oil, whereby the residual substances having odours are extracted into the oil phase, and the contents of hydrogen sulfide and mercaptanes in the waste water from the desalting apparatus are reduced to 0 – 4 ppm. Thus, the waste water can be discharged to river or sea as it is.

On the other hand, when the water is used as feed water to other apparatuses, no remarkable corrosion or other troubles due to the residual sulfur compounds is found, when the apparatus is dismantled and inspected after three months of the operation. That is, the separated water can be used sufficiently as feed water.

The separated hydrocarbon oil containing the absorbed substances having odours, such as hydrogen sulfide, mercaptanes, etc. is, after sufficient dehydration, treated in a hydrogenation-desulfurizing apparatus, wherein the sulfur compounds, that is, the substances having odours, are separated and recovered as hydrogen sulfide.

The crude oil, raw oil or hydrocarbon oil containing the absorbed hydrogen sulfide, mercaptanes, etc. which leaves the desalting apparatus, is led to a distillation apparatus, where the most of substances having odours is separated and recovered as hydrogen sulfide.

The recovered hydrogen sulfide is further recovered as elemental sulfur in a sulfur recovery apparatus.

In other embodiment than the above, the waste water effluent having odours is allowed to come in contact with a hydrocarbon oil thereby to absorb the substance having odours contained in the waste water effluent into the hydrocarbon oil, and the resulting mixture is separated into the oil and the water. Then, the separated water is again allowed to come in contact with a fresh hydrocarbon oil, for example, kerosene, gas oil, crude oil, etc., thereby to extract and transfer the residual substances having odours into the hydrocarbon oil. By repetition of these operations, the substances having odours contained in the waste water are further reduced, and can be discarded into river, sea or the like.

The present invention will now be explained in detail, referring to the accompanying drawing.

The drawing is a flow-diagram of an apparatus for carrying out the present invention.

A waste water effluent having odours 1 is adjusted to a pH of about 6.25 with a pH-adjusting agent such as a mineral acid or alkali at a position 2. Alternatively, the pH adjustment can be made with a pH-adjusting agent at another position 4, but when the pH of the waste water effluent having odours is greatly varied, it is preferable to employ the pH-adjusting agent at the position 2. The pH-adjusted waste water effluent is led to a surge drum 3, and mixed with a hydrocarbon oil 5. Then, the resulting mixture is led to a mixer 6, where the waste water effluent is sufficiently contacted with the hydrocarbon oil, and the substances having odours contained in the waste water effluent is extracted into the oil phase.

The mixing is carried out by a column provided with a plurality of perforated trays, etc., a packed column, or column or vessel provided with a stirrer, or a mixing valve, or a combination of these means.

The mixutre of hydrocarbon oil and waste water effluent leaving the mixer 6 is led to a first settler 7, where the oil and the water are separated from each other.

When the separation by means of the first settler 7, alone, is insufficient, depending upon the properties of the waste water effluent having odours, the properties of the hydrocarbon oil, and the mixing ratio of the oil and the water, the water and the oil are more completely separated from each other by an electric separation in a second settler 8, whereby entrainment of chlorine ions and various metal ions contained in the waste water effluent into the hydrocarbon oil is reduced, and entrainment of water is repressed to such a degree that corrosion of the hydrogenation-desulfurizing apparatus and poisioning of the hydrogenation-desulfurizing catalyst may be prevented. The sufficiently dehydrated hydrocarbon oil containing the substances having odours 9 is led to a hydrogenation-desulfurizing apparatus 10, and the deodorized waste water 11, which has been made free from the substances having odours, is used as feed water to other apparatus 12, for example, a desalting apparatus or gas scrubbing apparatus.

Now, the present invention is further explained, referring to examples.

EXAMPLE 1

The present invention was applied to a petroleum refinery industry, where the deodorized waste water was used as feed water to a desalting apparatus.

A waste water effluent having odours, containing 1,350 ppm of hydrogen sulfide, 14 ppm of mercaptanes, 213 ppm of ammonium ions and 26 ppm of chlorine ions and having a pH of 9.1 was adjusted to pH 6.25 with sulfuric acid, and then mixed with a distillate kerosene having a specific gravity of 0.7894 (15/4°C)

and containing 0 ppm of hydrogen sulfide, 201 ppm of mercaptanes and 0.08 ppm of chlorine ions, in a mixing ratio of the kerosene to the water effluent of 5 : 1 by volume, in a vessel provided with a stirrer. After the sufficient contact with the kerosene, the mixture was separated into the oil and the water in a settler. The water contained 152 ppm of hydrogen sulfide and 0 ppm of mercaptanes. Further, the water was used as feed water to a desalting apparatus, where it was contacted with crude oil in a volume of about 30 times that of the water. The water effluent from the desalting apparatus was found by analysis to have 3 ppm of hydrogen sulfide and was free from any odour.

On the other hand, the kerosene containing the absorbed substances having odours was slightly turbid in white, and contained 350 ppm of water. The kerosene was dehydrated by an electric dehydration under 1 KV – 2 KV, whereby the water content was reduced to 10 ppm. The chlorine ion content of the dehydrated kerosene was increased to 0.11 ppm by an increase of 0.03 ppm. The dehydrated kerosene was treated in a hydrogenation-desulfurizing apparatus, where the sulfur compounds, that is, the substances having odours, were recovered as hydrogen sulfide. No poisioning of the catalyst was brought about in the hydrogenation-desulfurizing apparatus in the presence of such a degree of the water and chlorine ion contents.

EXAMPLE 2

The present invention was applied to a petrochemical industry or the like where no desalting apparatus is employed. The deodorized waste water was used as feed water to a gas scrubbing apparatus.

Waste water effluent having odours, containing 945 ppm of hydrogen sulfide, 11 ppm of mercptanes, 220 ppm of ammonium ions and 29 ppm of chlorine ions and having a pH of 9.1 was adjusted to pH 6.25 with sulfuric acid, and then sufficiently mixed with a distillate kerosene having a specific gravity of 0.7867 (15/4°C) and containing 0 ppm of hydrogen sulfide, 185 ppm of mercaptanes and 0.07 ppm of chlorine ions in a mixing ratio of the kerosene to the waste water effluent of 5 : 1 by volume in a vessel provided with a stirrer, and then the mixture was separated into the oil and the water in a settler. The water contained 106 ppm of hydrogen sulfide and 0 ppm of mercaptanes. That is, the content of sulfur compounds, that is, the substances having odours, was much reduced, as in Example 1. Further, the water thus treated was used as feed water to a gas scrubbing apparatus. After three months, the gas scrubbing apparatus was dismantled and inspected, and no considerable increase in corrosion or other troubles due to these sulfur compounds was fouond. Thus, the water could be used sufficiently as the feed water.

On the other hand, the kerosene containing the absorbed substances having odours was slightly turbid in white, and had 340 ppm of water. The kerosene was dehydrated by an electric dehydration under 2 KV – 3 KV, whereby the water content was reduced to 7 ppm. The chlorine ion content was increased to 0.08 ppm by increase of 0.01 ppm. The resulting kerosene was treated in the hydrogenation-desulfurizing apparatus as in Example 1, where the sulfur compounds, that is, the substances having odours, were recovered as hydrogen sulfide.

EXAMPLE 3

The present invention was applied to a petroleum refinery industry, and a light oil was used as a hydrocarbon oil. The resulting deodorized waste water was used as feed water to a desalting apparatus.

A waste water effluent having odours, containing 1,050 ppm of hydrogen sulfide, 10 ppm of mercaptanes, 204 ppm of ammonium ions and 11 ppm of chlorine ions and having a pH of 9.0 was adjusted to pH 6.25 with sulfuric acid, and then mixed with a distillate light oil having a specific gravity of 0.870 (15/4°C) and containing 0 ppm of hydrogen sulfide, 115 ppm of mercaptanes and 0 ppm of chlorine ions, in a mixing ratio of the light oil to the water effluent of 7 : 1 by volume, in a vessel provided with a stirrer. After sufficient contact with the light oil, the mixture was separated into the oil and the water in a settler. The contents of hydrogen sulfide and mercaptanes in the water thus treated were 132 ppm and 2 ppm, respectively. The resulting water was used as feed water to a desalting apparatus. The water was contacted with a crude oil in a mixing ratio of the crude oil to the water of about 30 : 1 by volume, and the resulting water effluent from the desalting apparatus was analyzed. The content of hydrogen sulfide therein was 2 ppm and odorless.

On the other hand, the light oil having absorbed substances having odours was slightly turbid in white. It was dehydrated by an electric dehydration process as in Example 1, and treated in a hydrogenation-desulfurizing apparatus, where the sulfur compounds, that is, the substances having odours were recovered as hydrogen sulfide.

What is claimed is:

1. A process for treating a waste water effluent having odours, which comprises adjusting the pH of the waste water effluent having odours and containing hydrogen sulfide, mercaptanes and other sulfur compound to a pH of 7 – 6 with a mineral acid or alkali and then contacting said waste water effluent with a hydrocarbon oil having an average molecular weight of 100 – 300, the mixing ratio of said hydrocarbon oil to said waste water effluent being 10 - 1:1 by volume.

2. The process according to claim 1, wherein the waste water effluent is adjusted to a pH of 6.2 – 6.3 with a mineral acid or alkali before the contact.

3. The process according to claim 1 wherein separated water is further contacted with another hydrocarbon oil.

4. The process according to claim 1, wherein the separated water is further contacted with crude oil, raw oil or hydrocarbon oil in a desalting step.

5. The process according to claim 1, wherein separated oil is treated in a hydrogenation-desulfurizing means to recover sulfur compounds contained therein as hydrogen sulfide.

6. The process according to claim 1 wherein the separation into the oil and water includes an electric separation.

* * * * *